United States Patent Office 2,950,195
Patented Aug. 23, 1960

2,950,195

REMOVAL OF METAL IONS FROM GUM ARABIC

George R. Hodgins, Seaford, Erwin Di Cyan, Brooklyn, and Robert Timmerman, Amityville, N.Y., assignors to Litho Chemical and Supply Co. Inc., Lynbrook, N.Y., a corporation of New York No Drawing. Filed Dec. 5, 1956, Ser. No. 626,295

5 Claims. (Cl. 96—93)

The present invention relates to a lithographic product and process and more particularly to the preparation of a gum arabic solution and a deep etch positive sensitizer, for application to lithographic plates, which are free from water-insoluble calcium and magnesium salt precipitates and which remain precipitate-free.

Gum arabic is a water-soluble gum used extensively in preparing coating solutions for lithographic plates. In making such solutions, gum arabic is dissolved in water and may be used for desensitizing lithographic plates during printing and also for coating such plates for storage. One of the important uses of gum arabic solutions is in preparing a deep etch positive sensitizer. Gum arabic, however, contains calcium and magnesium which, when the gum arabic is dissolved in water, produce divalent positive calcium and magnesium ions. A typical sample of crystalline gum arabic contains the equivalent of approximately 0.7% calcium and 0.6% magnesium. A 28% aqueous solution of gum arabic contains the equivalent of 0.29–0.35% calcium calculated as $Ca^{++}$ and a proportionate amount of magnesium calculated as $Mg^{++}$, the solution having a specific gravity of 1.1069 at 25° C.

Lithographic deep etch positive coatings prepared from untreated gum arabic solutions develop precipitates on standing which form discontinuities in the dried film on the lithographic plates, pockmarking the plates and impairing the usefulness of the coating and plates. It has been found, for example, that 3-month old shelf samples of deep etch positive sensitizer contain heavy calcium and magnesium precipitates. The calcium and magnesium ions may be removed from gum arabic solutions by ion exchange, electrodialysis, etc., but these methods are tedious, requiring excessive amounts of time and expensive installation of equipment. The precipitates formed in the deep etch positive sensitizer cannot be allowed to form in solution since they require a long period of time to form before removal by filtration would be possible, thus requiring excessively large storage facilities at the manufacturing source. It has been determined that 70 p.p.m. of calcium per milliliter of deep etch positive sensitizer is the maximum concentration that can be retained in the coating without producing insoluble precipitates during the normal one year storage period.

Since it is not feasible to allow the precipitates to form and then to attempt to remove them, attention has been directed to the prevention of the formation of such precipitates in the coatings by intentionally causing precipitation in the initial aqueous gum arabic solution by the addition of a precipitant to form precipitates which can be readily removed so as not to leave more than 70 p.p.m. of calcium in the coating. This, too, has proved to be difficult and many precipitants have been tried without satisfactory results. It might be expected that precipitants containing $$PO_4^\equiv, S^=, SO_4^=, F^-, SiO_3^=, SO_3^=, \text{ and } C_4H_4O_6^=$$

ions would succeed but these produced incomplete precipitates leaving the gum arabic solution too high in calcium content. It will, therefore, be appreciated that an important and difficult problem remained unsolved.

The objects of the present invention are to overcome the problems and difficulties outlined above, to make it possible to produce gum arabic solutions low in calcium and magnesium content, to produce a deep etch positive sensitizer which remains free of precipitates and whose photographic sensitivity is not impaired, to obtain a satisfactory filtration flow rate in the removal of the calcium and magnesium precipitate and, in general, to effect important improvements in lithography.

The present invention is predicated upon the discovery that dibasic ammonium phosphate $(NH_4)_2HPO_4$ has surprising and unique properties when used in a stoichiometric amount with relation to the calcium and magnesium present in gum arabic, making it possible to effect substantially complete removal of those elements without adversely affecting the photographic sensitivity of the sensitizer subsequently produced having about 40 p.p.m. of calcium, or less, thus providing the coating with long shelf life and freedom from precipitates during the normal one year storage period. By using the calculated amount of $(NH_4)_2HPO_4$ necessary to react with the calcium and magnesium, the photographic speed of the deep etch positive sensitizer is unchanged, whereas an excess markedly slows down the photographic speed. The selectivity of $(NH_4)_2HPO_4$ will be appreciated from the fact that $Na_3PO_4$ results in filtrates high in calcium and, further, reduces the photographic speed of the coating, and $(NH_4)_3PO_4$ is not commercially available.

The invention is illustrated by the following example.

A gum arabic solution was prepared having the composition:

|  | Weight, grams | Percent |
|---|---|---|
| Water | 3,786.58 | 71.496 |
| Gum arabic crystals | 1,498.00 | 28.284 |
| Phenol (88%) | 11.62 | 0.219 |

This 28% (approx.) aqueous gum arabic solution has the calcium and magnesium contents set forth hereinabove.

9.0 grams of $(NH_4)_2HPO_4$ was stirred into 1 liter of the gum arabic solution at pH 4.20 and the pH was raised to 10.1 by adding 46.3 milliliters of 28% ammonium hydroxide solution. The whole was then allowed to stand for 40 hours to allow complete precipitation of calcium and magnesium phosphates to occur. The standing time must be sufficient so that no additional precipitate occurs after filtration of the resulting deep etch positive sensitizer, 24 hours having been found to be the safe minimum. The pH must be at least 8.5 as sufficiently low calcium contents cannot be obtained in the gum arabic filtrate with a lower pH value.

At the end of the standing period, there was added:

| | |
|---|---|
| Ammonium dichromate | grams__ 70 |
| Water | milliliters__ 183 |
| Alphazurine dye sol. (6%) | do____ 26.8 |
| Duponol ME (9.2% solution) | do____ 3.88 |

The Alphazurine dye may be replaced by Erioglaucine, Kiton pure blue or Patent blue VF, as dyes of this color index do not impair the photographic sensitivity of the coating. Instead of Duponol ME, other wetting agents may be used such as dioctyl sodium sulfosuccinate (Aerosol OT) or ethylene oxide phenolic condensates (Spans and Tweens).

The deep etch positive sensitizer thus formed was filtered through asbestos pads, using Solka Floc BW-100 (Brown Co.), thereby preventing clogging of the filter pads. The phosphate precipitate was removed in the following apparatus:

| Apparatus | Collecting Pad | Filter Aids |
|---|---|---|
| Buchner Funnel (15 cm.). | Whatman Filter Papers #51, 41, 52, and 31. | Solka Flocs BW-40, BW-100, BW-200; Alcoa Alumina A-5. |
| Air Pressure Pump (Horman & Co., Inc.) (2,800 cc. Horm) Laboratory Filter. | Pressed Paper Pad, Asbestos D-1 Pad. | Dicalites #4200, #740, Speedflow; Solka Flocs BW-40, BW-100, BW-200; Alcoa Alumina A-5. |
| Filter Press, Hormann & Co., Inc. (Model #ST-135). | Pressed Paper Pads, Asbestos D-1 Pads. | Solka Floc BW-100. |

The filtrate had the following composition:

| | Percent |
|---|---|
| Gum arabic | 21.0 |
| Ammonium bichromate | 5.0 |
| Alphazurine dye | 0.1 |
| Sodium lauryl sulfate | 0.1 |
| Water | 73.0 | and contains approximately 40 p.p.m. of calcium per milliliter. Its physical properties at 25° C. were:

| | |
|---|---|
| Baumé, ° | 15.7 |
| pH | 8.8 |
| Viscosity centipoises | 32.0 |

The ammonium ions from the $(NH_4)_2HPO_4$ and $NH_4OH$ remain as such in the solution and contribute slightly to the rise in pH without decreasing photographic sensitivity as if sodium salts are used.

The foregoing has been found to be critical since any material departures therefrom fail to give the required results. Except as to the $(NH_4)_2HPO_4$, which must be used in the exactly calculated stoichiometric amount based on the calcium and magnesium present, the other components must be used within 5% (plus or minus) of the specified quantities. The sensitizer can, if desired, be used without a dye with only slight loss of photographic sensitivity but the use of a dye is best and is, therefore, preferred. A deficiency or excess of wetting agent is to be avoided as it causes undesirable flow properties of the coating on the metal plate surface, resulting in uneven distribution of the dried coating over the plate surface. The procedure itself must be carried out in the order of steps as above described.

In practice, the invention gives excellent and consistent results and completely solves the intricate problem involved. Lithographic plates provided with a coating of the composition and nature described show no decrease in photographic sensitivity. Upon storage, no precipitation occurs and, therefore, perfectly smooth, continuous dried films can be formed on the lithographic plates. While treatment of gum arabic solution with Amberlite IR-120, on the sodium cycle, does not produce deep etch positive sensitizers of decreased sensitivity, ion exchange on the hydrogen cycle does, however, probably due to hydrolysis of the gum, rendering it more soluble in the developer. The chelating agents used have all produced soluble calcium and magnesium complexes, and have slowed the photographic speed of the coating.

The invention is defined by the appended claims.

We claim:
1. The method of preparing a precipitate-free aqueous gum arabic solution, containing approximately 73% water and 21% gum arabic and having not more than 70 parts per million of $Ca^{++}$ ions per milliliter from gum arabic containing about 0.7% calcium and about 0.6% magnesium which consists in adding to an initial gum arabic solution of the approximate composition:

| | Percent |
|---|---|
| Water | 71.5 |
| Gum arabic | 28.3 |
| Phenol (88%) | 0.2 | an amount of $(NH_4)_2HPO_4$ which is the stoichiometric equivalent of the calcium and magnesium ion contents of said solution, adding ammonium hydroxide to raise the pH of the solution to at least 8.5 and in the range of 8.5 to about 10, and allowing the whole to stand until no further calcium and magnesium phosphates precipitate.

2. The method of claim 1, in which the pH is raised to 10.1 by adding approximately 46.3 milliliters of 28% ammonium hydroxide per liter of the initial gum arabic solution.

3. The method of claim 1, in which the standing time is a minimum of 24 hours.

4. The method of claim 1, in which the calcium ion content is reduced to about 40 parts per million per milliliter with the $(NH_4)_2HPO_4$.

5. The method of claim 1, in which, at the end of the standing time, the initial gum arabic solution is converted to a lithographic, light sensitive coating by adding thereto about 70 grams of ammonium dichromate, dye, dispersant and about 183 milliliters of water per liter of said solution and then filtering.

References Cited in the file of this patent

UNITED STATES PATENTS

| | | |
|---|---|---|
| 2,340,311 | Donovan | Feb. 1, 1944 |
| 2,574,258 | Frost et al. | Nov. 6, 1951 |
| 2,624,673 | Frost et al. | Jan. 6, 1953 |
| 2,645,578 | Wood | July 14, 1953 |

OTHER REFERENCES

Hackh Chemical Dictionary, p. 48, 1944, Blakiston Co., Philadelphia.